No. 765,236. PATENTED JULY 19, 1904.
G. E. GAIFFE.
CONTROLLER FOR ELECTRICAL TRANSFORMERS
APPLICATION FILED APR. 4, 1902.
NO MODEL. 3 SHEETS—SHEET 1.
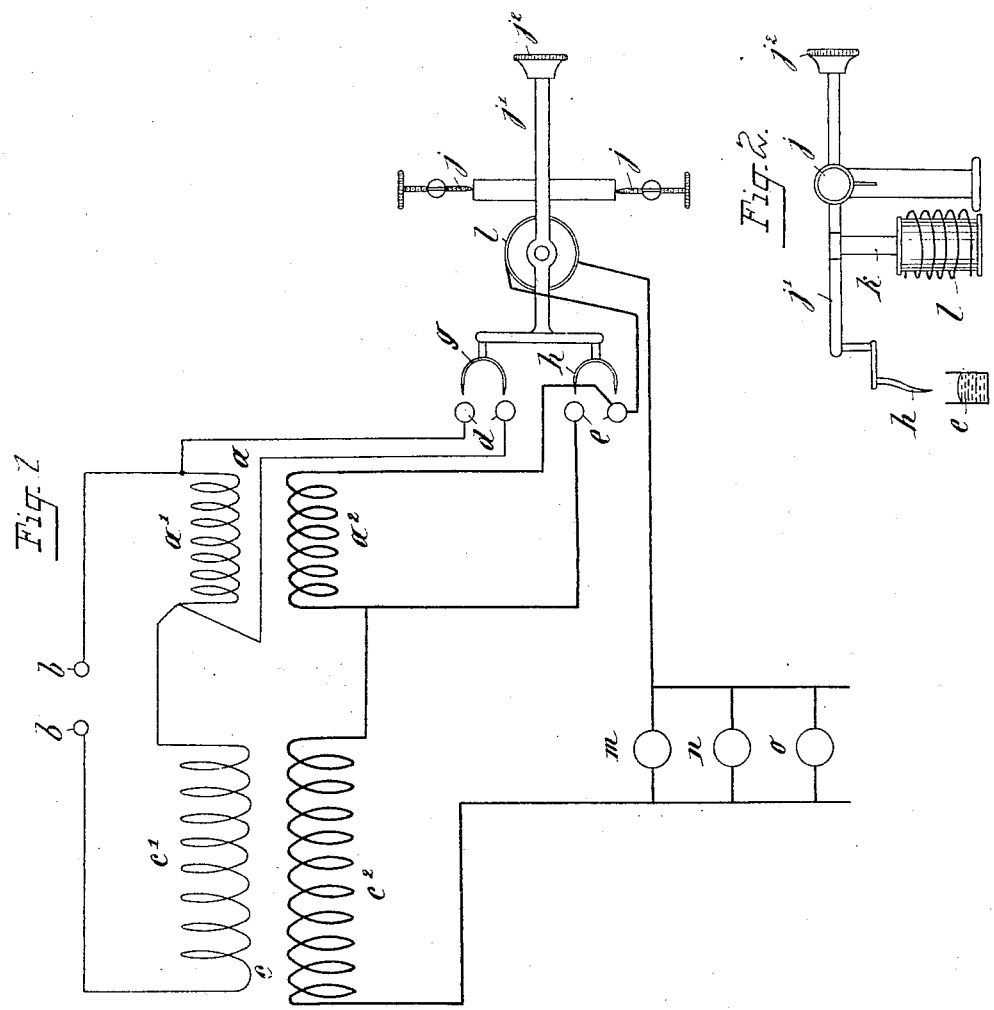

No. 765,236. PATENTED JULY 19, 1904.
G. E. GAIFFE.
CONTROLLER FOR ELECTRICAL TRANSFORMERS.
APPLICATION FILED APR. 4, 1902.
NO MODEL. 3 SHEETS—SHEET 2.
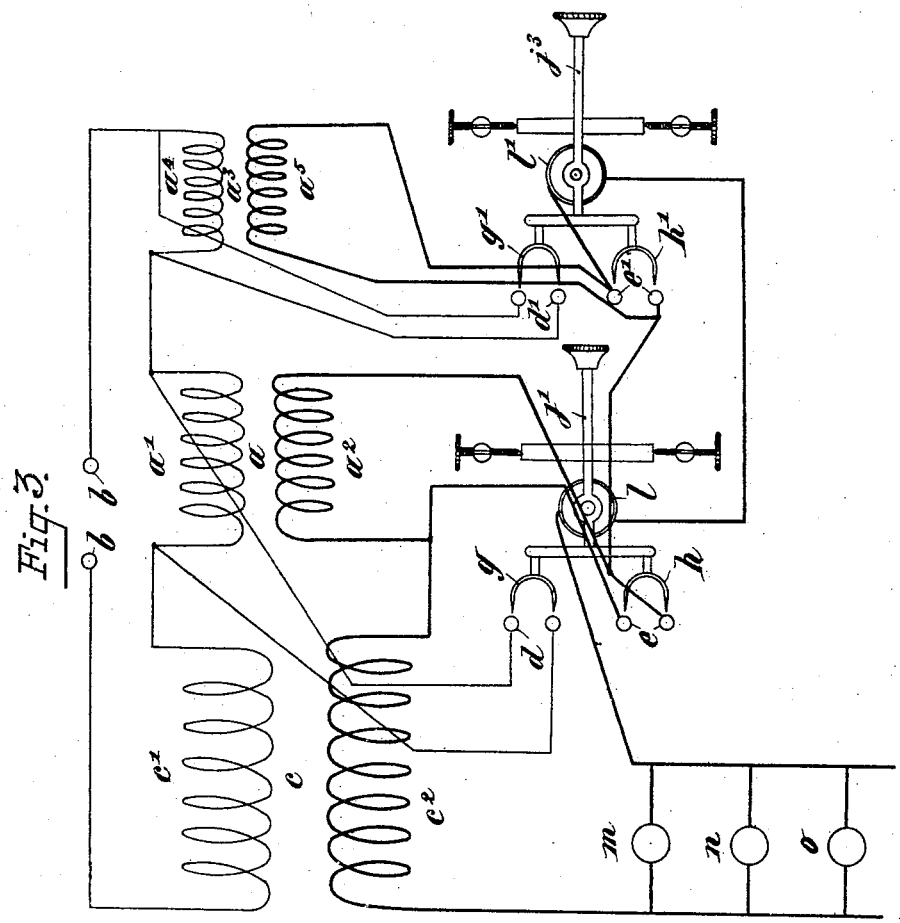
WITNESSES:
INVENTOR
Georges Eugene Gaiffe
BY Richards & Co
ATTORNEYS.

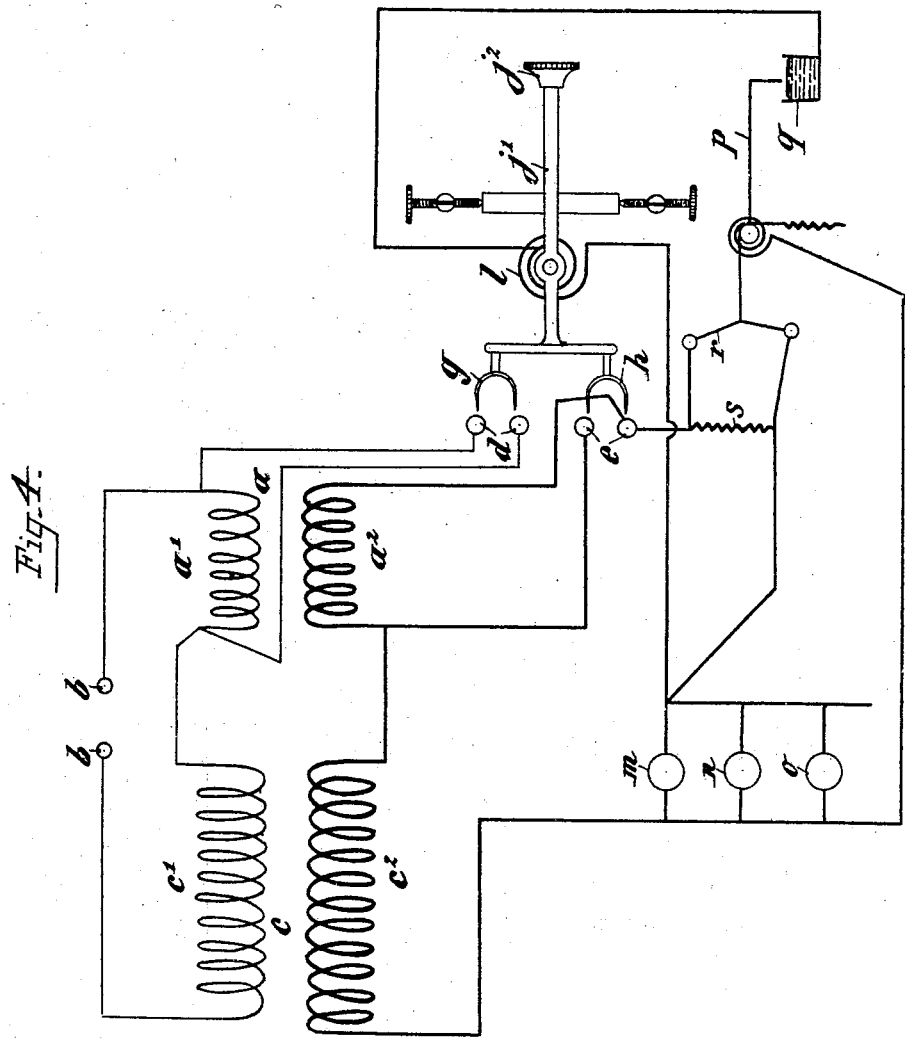

No. 765,236.

Patented July 19, 1904.

UNITED STATES PATENT OFFICE.

GEORGES EUGÈNE GAIFFE, OF PARIS, FRANCE.

CONTROLLER FOR ELECTRICAL TRANSFORMERS.

SPECIFICATION forming part of Letters Patent No. 765,236, dated July 19, 1904.

Application filed April 4, 1902. Serial No. 101,405. (No model.)

*To all whom it may concern:*

Be it known that I, GEORGES EUGÈNE GAIFFE, manufacturer of precision instruments, of 40 Rue St. André des Arts, in the city of Paris, Republic of France, have invented a Controller for Electrical Transformers, of which the following is a full, clear, and exact description.

In all the systems for distributing alternating currents the current is supplied from the generating-station at a very high tension and is brought to the desired voltage by transformers at the places where the current is consumed. Since conductors carrying high-voltage currents are a source of danger, these transformers are most frequently inclosed. They are consequently permanently in circuit with the generator, and it is impossible to reach them in order to break the primary circuit when the secondary circuit is not in use. Therefore the result is that there is a continual consumption of current in the primary coils of these transformers. Moreover, transformers only have an economical (and consequently commercially valuable) efficiency when the consumption of current in the secondary or consumer's circuit is not less than a definite limit, which is different for different transformers.

The present application for a patent has for its subject an electrical economizing apparatus which is designed to reduce in a large measure the consumption of current when the secondary current is not being used or the current used is below the limit above which the efficiency of the transformer becomes satisfactory commercially.

My apparatus is characterized, essentially, by the addition to the principal transformer of a small auxiliary transformer of low power and small current which is put into circuit when no current is being used in the secondary circuit or less current is being used than corresponds to the commercially satisfactory efficiency of the principal transformer and is cut out of circuit when the secondary circuit is closed or when the consumption of current in the said secondary circuit has reached the amount corresponding to the commercially satisfactory efficiency of the principal transformer. The primary circuit of this auxiliary transformer of low power and small current can be connected directly to the generator-mains, and in this case the secondary, which is connected during the time of rest in the consumer's circuit, actuates an electromechanical switching apparatus of any suitable construction operating to switch the primary circuit of the principal transformer into circuit with the mains from the generating-station, as well as to close the secondary circuit of this transformer when the secondary or consumer's circuit is closed and to break both circuits immediately this secondary circuit is opened or interrupted. The secondary circuit of the auxiliary transformer is broken or completed accordingly as the circuits of the principal transformer are closed or opened. My apparatus therefore permits the difference between the consumption of energy on open circuit in the transformer proper and in the auxiliary transformer to be saved during the times of rest.

The electromechanical switching apparatus can be arranged directly in series with the consumer's circuit, or it can be placed in parallel with this circuit. In the latter instance an interrupting-relay is intercalated in this shunt and is controlled in such a manner as to close this shunt-circuit at the desired moment. The auxiliary transformer can, however, be mounted in series with the principal transformer, which is calculated to furnish the whole of the current necessary to feed the consumer's circuit. The primary circuits of these two transformers are arranged in series and connected to the conductors from the generating-station. Their secondary circuits are also arranged in series and connected to the consumer's circuit. Moreover, as soon as current commences to be consumed in the secondary circuit or as soon as this current has reached the value corresponding to the commercially satisfactory efficiency of the principal transformer the auxiliary transformer is cut out of circuit by apparatus actuated either electrically, mechanically, by hand, or by a combination of these means. The auxiliary transformer should be so designed that when the two transformers are in series the sum of the voltages in their secondary circuits, which are also connected in series, may be equal to the voltage required in the consumer's circuit. When the secondary circuit is open or is supplying less current than that which corresponds to the commercially satisfactory efficiency of the principal transformer, the auxiliary transformer is again put in series with the principal transformer. The arrangement in series of the primary circuits and also of the secondary circuits of both transformers reduces the waste on open circuit, since the self-induction of the primary coils is much greater than when only a single transformer is employed.

My arrangement permits a considerably-higher efficiency than that yielded by ordinary apparatus to be obtained, since when on open circuit and when consuming small amounts of power only the losses in the combined primary circuits are very much less than in the apparatus heretofore employed.

My economizing apparatus can comprise several auxiliary transformers used successively as electricity-generators. These transformers can furnish current of different intensities or strengths and can enter automatically and successively into operation in accordance with the variations of the current in the consumer's circuit.

In order that I may be readily understood, I have shown in the accompanying drawings, in principle and as an example only, one method of carrying my invention into practice.

Figures 1 to 4 show my arrangement in the case in which the auxiliary transformer is arranged in series with the principal transformer. Fig. 1 is a diagram of the installation. Fig. 2 is an elevation showing the electromechanical controlling or switching apparatus for cutting the auxiliary transformer out of circuit. Fig. 3 shows the application of two economizing auxiliary tranformers. Fig. 4 shows a modification in which the apparatus for cutting the auxiliary transformer out of circuit is in parallel with the consumer's circuit.

In the figures like letters of reference indicate corresponding parts.

The primary circuits $a'$ $c'$ of these two transformers, Fig. 1, are connected in series, and the terminals of these primary circuits are connected to the terminals $b$ of the mains from the generating-station. The secondary coils $a^2$ $c^2$ are likewise arranged in series and are connected to the consumer's circuits $m$ $n$ $o$, in which the devices forming the load are placed and to the circuit $l$ of the electromechanical switching apparatus. Both ends of the primary coil $a'$ of the auxiliary transformer $a$ are connected to the two mercury-cups $d$ and the two terminals of the secondary coil $a^2$ to the two cups $e$. Both cups $d$ and both cups $e$ are respectively connected together at the moment when it is required to cut the transformer $a$ out of circuit by means of bridge-pieces $g$ $h$. These latter are supported at the end of a lever $j'$, rotatable about a spindle $j$ and provided at its other end with a movable counterweight $j^2$, which permits the apparatus to be adjusted in such a manner that it acts only when a current of predetermined amount flows through the circuit $l$. The lever $j'$ also carries a core $k$, Fig. 2, under the control of the solenoid through which the current in the consumer's circuit flows whatever be the position of the swinging arm. When there is no load in circuit and no current is flowing through the consumer's circuit, the solenoid $l$ has no action upon the core $k$ and the counterweight $j^2$ holds the bridge-pieces $g$ $h$ out of the mercury-cups $d$ $e$. As soon as there is a load on the consumer's circuit the two secondary circuits $a^2$ $c^2$ supply current to the consumer's circuit, and consequently to the solenoid $l$ also. When the current has reached a predetermined value, the electromechanical switching apparatus operates. The core $k$, attracted by the solenoid $l$, swings the lever $j'$, and the bridge-pieces $g$ $h$ dip into the cups $d$ $e$, respectively. Each of these bridge-pieces thus short-circuits one circuit of the auxiliary transformer $a$, which is thus cut out of the circuit, so as to leave in the principal transformer $c$ only. On the other hand, when the current decreases below the limit fixed, or when the whole of the load is cut out, the core $k$ being no longer attracted, the lever $j'$ under the action of its counterweight $j^2$ swings so as to move the bridge-pieces $g$ $h$ out of the cups $d$ $e$, and thus again brings the economizing auxiliary transformer into operation.

In order to reduce the voltage at the terminals of the primary coil of the auxiliary transformer to a minimum at the moment of making or breaking the circuit in this apparatus, my arrangement is connected up in such a manner that the secondary coil of this transformer is short-circuited before the primary coil, which arrangement can be employed without danger, since the primary coil of the principal transformer always remains in circuit. For this purpose the two bridge-pieces $g$ $h$ are so mounted that the bridge-piece $h$ dips into its cups before the bridge-piece $g$. The secondary coil $a^2$ of the transformer $a$ being first of all closed on itself, the self-induction of this transformer is considerably reduced. The terminal voltage of the primary coil $a'$ diminishes to the advantage of the primary coil $c'$ of the principal transformer $c$, so that the short-circuiting of the primary coil $a'$ is effected at a reduced voltage. Similarly, when the current in the consumer's circuit diminishes and the transformer $a$ is about to be placed in circuit the bridge-piece $g$ breaks contact before the bridge-piece $h$, with the advantage pointed out hereinabove.

In the case of small substations the auxiliary transformer $a$ can be employed solely for the purpose of putting the principal transformer $c$ alone in circuit whenever a load is put on. In the case of large substations the electromechanical switching apparatus is adjusted, as hereinabove described, in such a manner as to swing only when the consumer's current has reached a value corresponding to the commercially satisfactory efficiency of the principal transformer $c$. For very large and important substations I can, if desired, as in the preceding instance, combine several auxiliary economizing transformers with the principal transformer. These auxiliary transformers are successively cut out of circuit as the current in the consumer's circuit increases, but only at the moments when the remaining transformers reach their commercially satisfactory efficiencies, and so on until the last remaining auxiliary transformer is cut out of circuit, when the principal transformer reaches its commercially satisfactory efficiency.

Fig. 3 shows as an example a diagram of the connections of a principal transformer $c$ in combination with two economizing auxiliary transformers $a\, a^3$. The primary coils $a'\, a''$ of both auxiliary transformers are connected in series with the primary coil $c'$ of the principal transformer, as hereinbefore described, and the two terminals of these primary coils are connected to the mercury-cups $d\, d'$, respectively. The secondary coils $a^2\, a^5$, also in series, are connected to the load or consumer's circuit, which includes the circuits $l\, l'$ of the electromechanical switching apparatus corresponding to each transformer. The two terminals of these secondary coils are connected to the mercury-cups $e\, e'$, respectively. When no current is flowing through the consumer's circuit, the two levers $j''\, j^3$ hold the bridge-pieces $g\, h\, g'\, h'$ out of the cups $d\, e\, d'\, e'$. As soon as a load is thrown into the consumer's circuit the three secondary circuits $c^2\, a^2\, a^5$ supply current to the consumer's circuit, and when the current increases to the amount for which the last auxiliary transformer $a^3$ has been adjusted the lever $j^3$ swings over, so as to put the transformer $a^3$ out of circuit, leaving in circuit the two transformers $c\, a$. The electromechanical switching apparatus corresponding to the transformer $a^3$ is adjusted in such a manner that the lever $j^3$ only swings at the moment when both transformers $c\, a$ have jointly reached their commercially satisfactory efficiency. When the current in the consumer's circuit has again increased and corresponds to the commercially satisfactory efficiency of the principal transformer $c$, the electromechanical switching apparatus of the auxiliary transformer $a$, adjusted to permit the lever $j''$ to swing over at this moment, puts the transformer $a$ out of circuit. The arrangement operates in the reverse way as the amount of the current flowing through the consumer's circuit diminishes.

The apparatus for cutting the auxiliary transformer out of circuit can be put directly in series with the consumer's circuit, as hereinbefore stated; but it is preferably arranged as a shunt to this circuit. In this case a relay-circuit breaker or interrupter is intercalated in this shunt, and the said relay-circuit breaker is adjusted so as to switch the current into the circuit $l$ of the swinging-arm switching apparatus at the desired moment. The said relay-circuit breaker can be of any suitable construction. It can be constructed as hereinbefore described and as shown in Fig. 4, comprising a lever $p$, terminating in a point capable of dipping into a mercury-cup $q$ and controlled by a termal galvanometer, the expansible wire $r$ of which is traversed by a part of the secondary current, the other part flowing through a suitable resistance $s$. By means of this latter arrangement a quick make and break of the circuit is obtained at the precise instant required in the circuit $l$ of the swinging-arm switching apparatus. The movements for short-circuiting or throwing in the auxiliary transformer are thus effected very rapidly. Moreover, this arrangement permits a large amplitude of motion to be given to the bridge-pieces, so that the apparatus can be employed to break circuit without inconvenience even when very high voltages are employed.

In the case of an economizing arrangement comprising a plurality of auxiliary transformers a relay-circuit breaker or interrupter with a swinging-arm switching apparatus will be provided corresponding to each transformer.

The form, dimensions, and detail arrangements of my economizing apparatus can be varied according to the various needs of particular applications.

I claim—

An economizing apparatus comprising a principal and an auxiliary transformer having their primary coils in series and connected with the mains and their secondary coils also in series and connected with the consumer's circuit, and means for cutting in and out the auxiliary transformer, controlled from the conditions in the consumer's circuit, the said means short-circuiting the secondary circuit of the auxiliary transformer before the primary circuit thereof, substantially as described.

The foregoing specification of my electrical device for economically transforming alternating currents signed by me this 25th day of March, 1902.

GEORGES EUGÈNE GAIFFE.

Witnesses:
EDWARD P. MACLEAN,
MAURICE H. PIGNET.